United States Patent [19]

Mohrbacher et al.

[11] Patent Number: 5,231,488

[45] Date of Patent: Jul. 27, 1993

[54] SYSTEM FOR DISPLAYING AND READING PATTERNS DISPLAYED ON A DISPLAY UNIT

[75] Inventors: Bernard K. Mohrbacher, Santa Barbara, Calif.; Franklin N. Eventoff, 7086 Atwood Rd., Feindale, Wash. 98248

[73] Assignee: Franklin N. Eventoff, Ferndale, Wash.

[21] Appl. No.: 757,750

[22] Filed: Sep. 11, 1991

[51] Int. Cl.⁵ .............................. H04N 17/00
[52] U.S. Cl. .................................. 358/139; 340/721; 84/615; 84/619; 84/724; 84/653; 84/657
[58] Field of Search .................. 358/10, 139; 340/721, 340/723; 84/615-619, 639, 640, 653-657, 678, 681, 684, 685, 724, 477 R, 478, DIG. 6, DIG. 19

[56] References Cited

U.S. PATENT DOCUMENTS

| | | | |
|---|---|---|---|
| 4,215,343 | 7/1980 | Ejiri et al. | 340/711 |
| 4,329,684 | 5/1982 | Monteath et al. | 340/707 |
| 4,415,921 | 11/1983 | Mulvanny et al. | 358/139 |
| 4,485,394 | 9/1984 | Ghaem-Maghami et al. | 358/10 |
| 4,518,991 | 5/1985 | Dureux | 358/139 X |
| 4,613,904 | 9/1986 | Lurie | 358/142 |
| 4,807,031 | 2/1989 | Broughton et al. | 358/142 |
| 4,897,721 | 1/1990 | Young et al. | 358/139 |
| 4,920,503 | 4/1990 | Cook . | |
| 4,956,639 | 9/1990 | Vemura et al. | 358/148 X |
| 4,999,617 | 3/1991 | Vemura et al. | 358/142 X |

Primary Examiner—William M. Shoop, Jr.
Assistant Examiner—Jeffrey W. Donels
Attorney, Agent, or Firm—Robbins, Dalgarn, Berliner & Carson

[57] ABSTRACT

A system to transfer information from a video screen. A sensor embedded in a suction cup detects an increase in intensity of a synchronizing scan line and an increase in intensity of a data scan line and utilizes the time differential between the two events to determine the location of the increase in intensity of the data scan line. In an alternative embodiment, the intensity increase location may be transferred to an electronic musical instrument where it is analyzed by a microprocessor and the information is used to assign notes to the keys of a keyboard.

11 Claims, 3 Drawing Sheets

SYSTEM FOR DISPLAYING AND READING PATTERNS DISPLAYED ON A DISPLAY UNIT

BACKGROUND OF THE INVENTION

The present invention relates to the field of video sensing systems and, in particular, to a data transfer system for sensing coded information displayed on scan lines on a video screen.

The transfer of data through a television or a video screen is known. For example, U.S. Pat. No. 4,329,864, issued to Monteath et al., discloses an apparatus using a light sensing system for sensing information displayed in a selected region of scan lines on a light emitting device. In the disclosed apparatus, a light pen utilizes a photo cell to read a region or patch comprised of three or four scan lines sensed as a group to determine if the scan lines in the region are on or off. The Monteath patent assumes a 50 fields per second scanning rate, producing a bit rate of 50 bits per second because the region yields one bit per screen refresh.

U.S Pat. No. 4,613,904, issued to Lurie, discloses an apparatus to read a rolling bar code from a selected location on a television screen. The apparatus disclosed by Lurie is removably secured to the television screen and uses a photo cell to receive successive channel identifying information displayed on the screen. The apparatus in Lurie is directed toward monitoring of television channels and includes a previous-code register to store channel identification words to determine when a viewer has switched channels.

U.S Pat. No. 4,956,639, issued to Uemura, includes a photosensor for reading bar code data and a counter circuit for counting the coded data read by the photosensor to determine whether the data is displayed by an odd-number scanning field or an even-number scanning field and produce a corresponding signal. A plurality of timing circuits interact with the signal to synchronize the storing of the data.

U.S Pat. No. 3,993,861, issued to Baer, discloses a system for communicating a binary-coded, digital message that is displayed as a brightness modulation in a display screen. A light sensor detects the brightness modulation of each scan line to determine if segments of the scan line appear bright or dark, corresponding to digital "ones" and "zeros".

The rolling bar code devices disclosed in the Monteath, et al. and Lurie patents require complex circuitry to receive and analyze sequential information. Also, the speed of the disclosed devices is limited to the refreshment rate of the display screen, as disclosed in Monteath et al., a rate of 50 bits per second. While this speed is sufficient for the programming of a television receiver for later use, as suggested in Monteath et al., or for storing channel identifying information, as proposed by Lurie, a rate of 50 bits per second is insufficient for many "real time" data transfer applications. The apparatus disclosed by Uemura requires complex timing circuitry to determine whether data is being display on an odd or even scanning field. Finally, the Baer apparatus requires the use of an expensive high speed photo transistor to sense multiple on and off conditions occurring within a single scan line.

Musical data, including chord configurations, is used by musicians to determine notes in harmony with a composition. When a musical instrument is played in accompaniment with a musical composition, the correct notes must be selected from a set of notes in the scale of the music. The playing of a note that is not in the set of notes in the scale of the composition results in a dissonant sound. For example, a composition played in the key of C may be easily accompanied by using only the white keys in the C scale on a piano, but using one of the black keys will result in the playing of a dissonant note.

One method of transmitting compositions to musicians is through a television program or a music video. Accompanying a music video with a musical instrument requires selecting notes in the scale of the composition. Problems arise because the chords, melody lines and expression of the composition may change rapidly, resulting in a continuously changing set of notes within the scale of the music. Beginning musicians, in particular, lack the skill to accurately select notes in harmony with a composition. Therefore, it is desirable to provide an inexpensive system for transferring data that is capable of transmitting real-time chord configuration changes by simultaneously transferring multiple bits of composition data.

SUMMARY OF THE INVENTION

The present invention is a system that transfers information through a unique auxiliary apparatus, allowing the reception of a complex data image through inexpensive circuitry. A photo diode is embedded in a suction cup to detect increases in the intensity of a scan line. A leading edge detector and a counter/timer interact to determine the location on each scan line of an increase in intensity. This location determines the value or code of the scan line.

One use of the present invention is for transferring data images comprising a coded pattern corresponding to musical composition data from a video screen to an electronic musical instrument. The data is analyzed by a microprocessor in the instrument and the information is used to adjust the notes produced by a sound generator to be in harmony with the scale of the music played by a speaker associated with the video screen. The pressing of a single key on a keyboard associated with the musical instrument will generate different notes as the scale of the composition changes.

Specifically, the present invention comprises: a data transfer system, including a video screen having a data display area; means for displaying a synchronizing scan line having an intensity that increases with each video screen refresh at a predetermined location in the data display area of the video screen. This location determines the value or code of the scan line.

One use of the present invention is for transferring data images comprising a coded pattern corresponding to musical composition data from a video screen to an electronic musical instrument. The data is analyzed by a microprocessor in the instrument and the information is used to adjust the notes produced by a sound generator to be in harmony with the scale of the music played by a speaker associated with the video screen. The sensing means senses an increase in intensity of the data scan line whereby to determine the location of the increase in intensity of the data scan line in the data display area.

BRIEF DESCRIPTION OF THE DRAWINGS

In the drawings, which constitute a part of this specification, an exemplary embodiment exhibiting various objectives and features hereof is set forth, specifically.

DETAILED DESCRIPTION

As required, a detailed illustrative embodiment of the present invention is disclosed herein. Recognizing that various mechanical components and various structural elements may be embodied in a wide variety of forms, some of which may be quite different from those specific structural and functional details disclosed herein, the details disclosed herein are merely representative; yet in that regard they are deemed to afford the best embodiment for the purposes of disclosure to provide a basis for claims herein which define the scope of the present invention.

Figure 1:
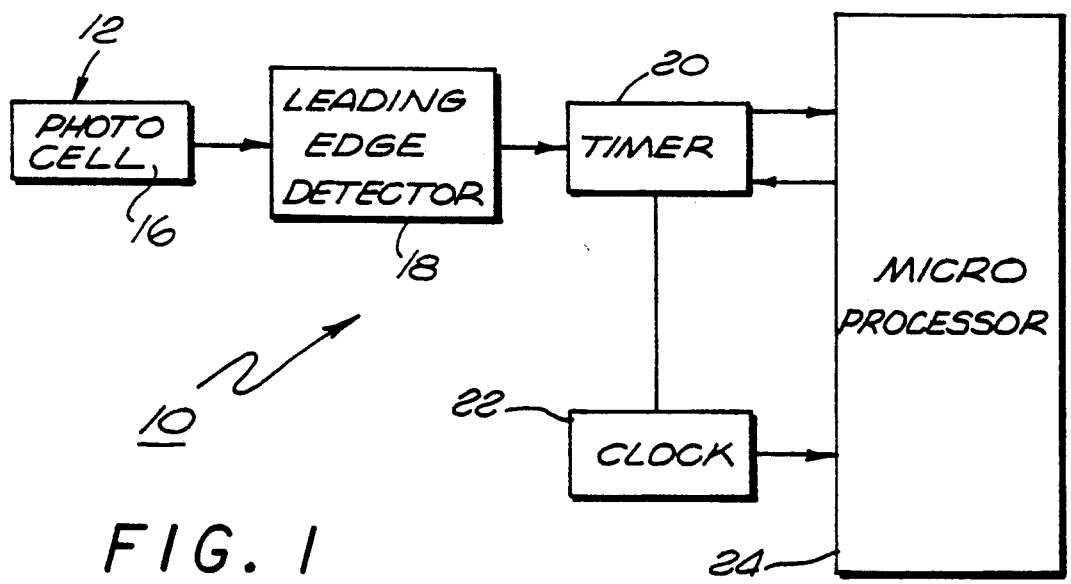
FIG. 1 is a block diagram of a data transfer system with data transferred from a video screen through a photo diode.

Referring to FIG. 1, a data transfer system 10 constructed according to the present invention is illustrated. The illustrated apparatus has a receiver or a data input device 12 for receiving data images from a video screen 14 (FIG. 2) through a photo diode 16. The photo diode 16 develops a signal that corresponds to the intensity of the video screen 14. The signal is transmitted to a leading edge detector 18, which determines when a sharp increase occurs in the photo diode signal, indicating a sharp increase in the intensity of a scan line. When a sharp increase is detected, the output of the leading edge detector 18 latches a counter or timer 20 that is driven by a clock 22. The timer 20 may be a standard counter/timer, such as an Intel 8254, with a timing resolution of 0.125 microseconds or any other suitable leading edge detector that is capable of differentiating between small distances along a scan line.

The clock 22 drives the timer 20 and a microprocessor 24 to insure that the timer 20 and the microprocessor 24 are synchronized. The timer 20 is continually active while the data transfer system 10 is active. Generally, the timer 20 is a counter and when the timer 20 is latched by the leading edge detector 18, the timer 20 transmits its count to the microprocessor 24. The video screen 14 displays data in a data display area 28, shown at the lower right corner of the video screen of FIG. 2. Each time the video screen 14 is refreshed, it displays a synchronizing scan line with an intensity that increases at a predetermined location in the data display area 28. The video screen 14 also displays at least one electronic data scan line with an intensity that may increase only at a plurality of predetermined locations on the scan line in the data display area 28.

Figure 2:
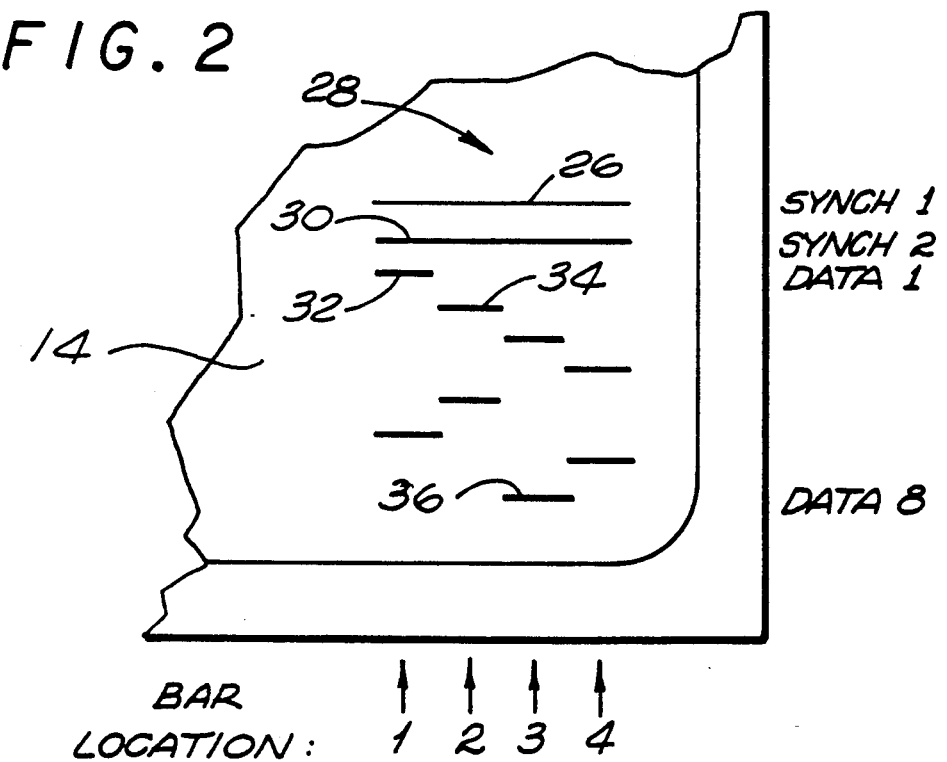
FIG. 2 is a partial elevational view of a video screen with synchronizing scan lines and data scan lines.

With each video screen refresh, the first scan line detected by the photo diode 16 is a first synchronizing scan line 26 to establish the leftmost boundary of data display area 28 on the video screen 14. As illustrated in FIG. 2, the first synchronizing scan line 26 is initially illuminated at the leftmost edge of the data display area 28 and is illuminated until the rightmost edge of the data area. A second synchronizing scan line 30 may be similarly illuminated as a validity check. The data scan lines follow, each having only a portion of the scan line, called a bar, illuminated. The number of synchronizing scan lines and data lines may vary with data transfer rate requirements.

The location of the illuminated bar in each data scan line is determinative of the value of the data scan line. In FIG. 2, four different bar locations are shown. However, this number may vary with data transfer rate requirements, and for example, eight different bar locations may be used.

When the first synchronizing scan line 26 is initially illuminated, the photo diode 16 (FIG. 1) senses the video screen 14 intensity at that scan line and the leading edge detector 18 detects an increased brightness of the scan line. At that time, the timer 20 is latched and its count is transmitted to the microprocessor 24 as a reference count and all succeeding counts for each screen refresh are appraised relative to the reference count.

Figure 3A:
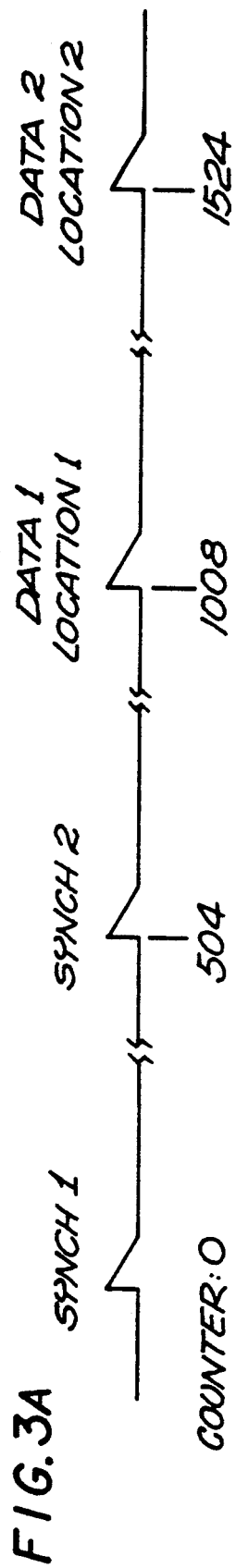
FIGS. 3A-3C are waveform diagrams of the wave generated by the photo diode as the synchronizing scan lines and the data scan lines of FIG. 2 are displayed on the video screen.
Figure 3B:
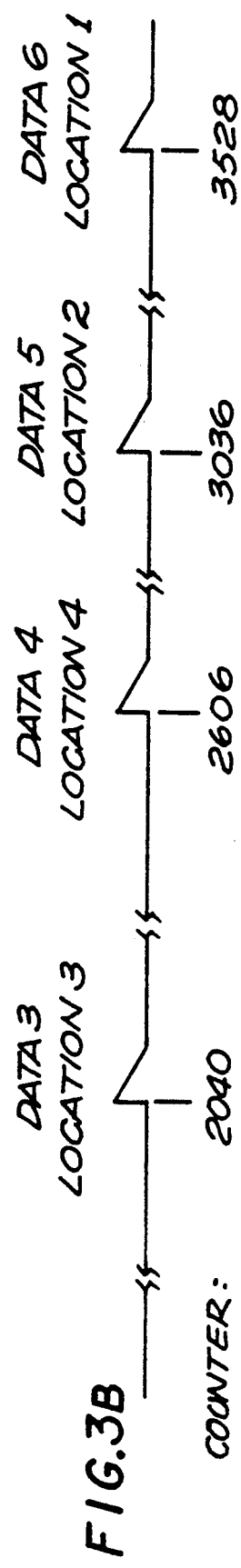
Figure 3C:
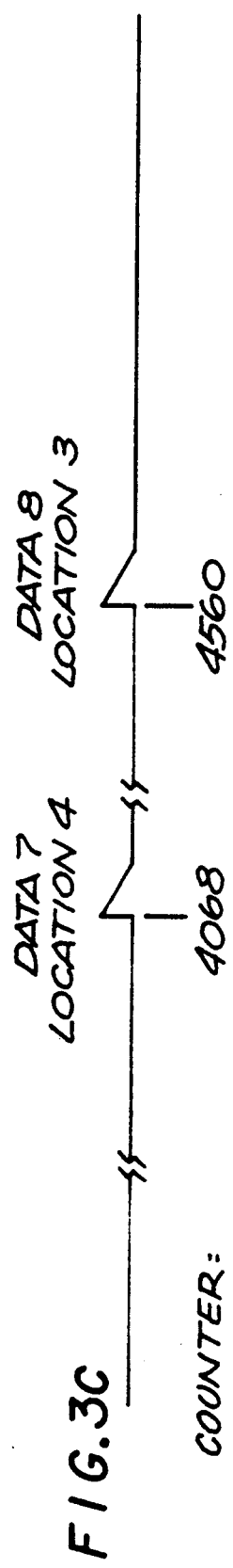
Figure 4:
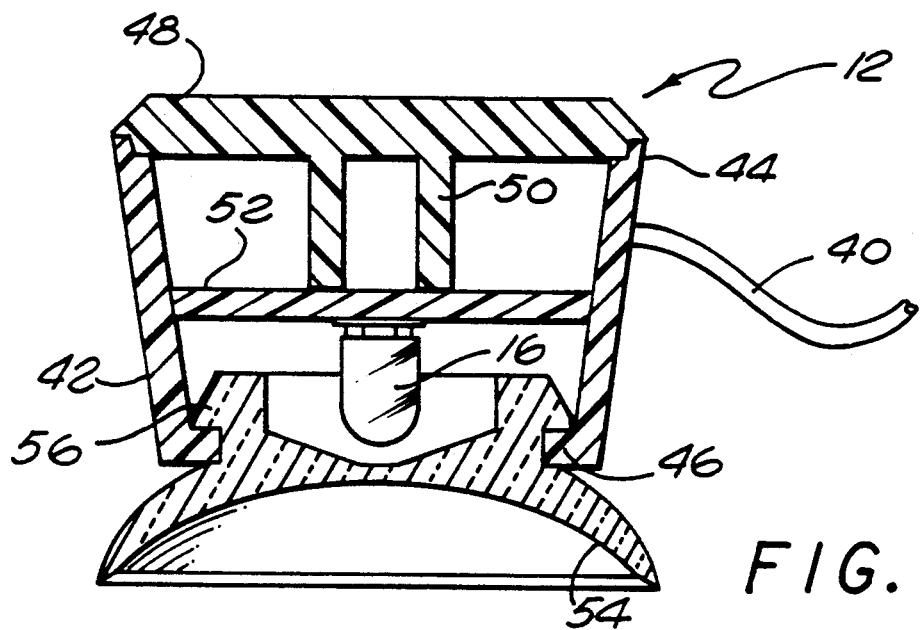
FIG. 4 is an elevational cross-sectional view of a data input device according to the present invention.
Figure 5:
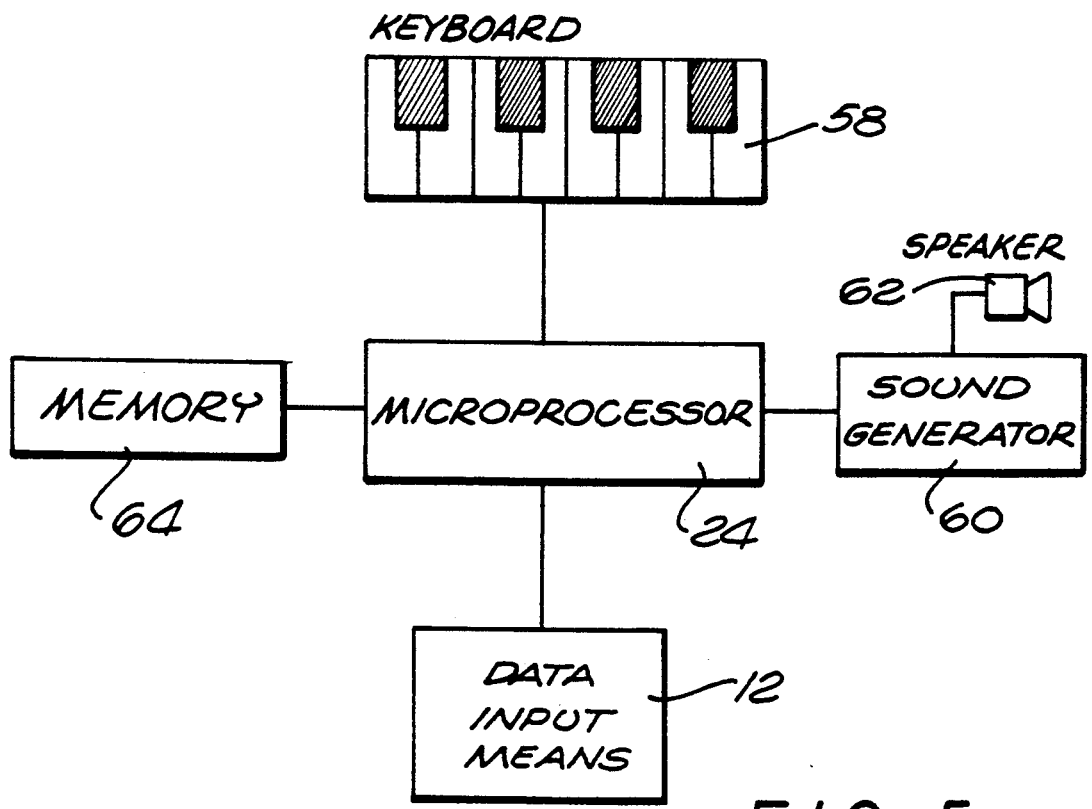
FIG. 5 is a schematic diagram illustrating the interconnection of the various component parts of the invention with an electronic musical apparatus.

Referring to FIGS. 3A-3C, the waveform generated by the photo diode 16 as the synchronizing scan lines and the data scan lines of FIG. 2 are displayed on the video screen 14 is depicted with an illustrative count shown below the waveform. The time difference between bar locations on a scan line is predetermined and, in this example, a time difference of approximately 1.5 microseconds is used between the leading edge of adjacent bar positions. Using a counter/timer with a timing resolution of 0.125 microseconds, a 12 count differential between bar locations occurs. This number may vary with the speed of the counter/timer and the video screen.

Although the photo diode 16 continues to sense and the timer 20 continues to count when the data display area 28 is not being refreshed, in FIGS. 3A-3C the photo diode waveform and the count for this time period is not shown in proportion to the relevant waveform and count.

In the example of FIGS. 2 and 3A-3C, when the first synchronizing scan line 26 is initially illuminated, the leading edge detector 18 latches the timer 20 at the count 0. This count is transmitted to the microprocessor 24 where it is stored as a reference count. The initial illumination of the second synchronizing scan line 30 latches the timer 20 at count 504. Therefore, a count of 504 (the difference between the count of the first synchronizing scan line 26 and the second synchronizing scan line 30) is established as an adjacent scan line count differential between the leftmost edge of adjacent scan lines in the data display area 28. The adjacent scan line count differential and the preestablished 12 count differential between bar locations are used by the microprocessor 24 to determine the illuminated bar location of each data scan line.

In FIG. 2, the first scan line following the two synchronizing scan lines is a first data scan line 32. As shown, the bar location illuminated in the first data scan line is the first bar location. A second data scan line 34 has bar location 2 illuminated, and an eighth data scan line 36 has bar location 3 illuminated.

To determine which bar location is illuminated in each data scan line, the present invention utilizes the adjacent scan line count differential (504) and the preestablished 12 count differential between bar locations discussed above. As shown in FIG. 3A, when the second bar is illuminated in the second data scan line 34, the leading edge detector 18 latches the timer 20 at the count 1524. This is interpreted by the microprocessor 24 as 3*504+12, meaning: the third scan line after the first synchronizing scan line 26 with the second bar location illuminated. Similarly, in FIG. 3C, the count of 4560 associated with the illumination of the eighth data scan line 36 is interpreted by the microprocessor 24 as 9*504+24, meaning: the ninth scan line after the first synchronizing scan line 26 with the third bar location illuminated.

The video screen 14 is grouped into odd and even scan lines and different bar illuminations may be displayed on the different scan line groupings. The bar illuminations may be altered at a rate of sixty frames per second corresponding to twice the rate the video screen 14 is refreshed because the screen is scanned twice for each video frame, once for the odd scan lines and once for the even scan lines. The transmission of data images through a discrete target area in the video screen 14 permits the transfer of data from a video screen without the need to decode a complex video signal because the video screen 14 separates the data images from the remaining signal.

The data input device 12 of the present invention permits the transmission of data images of the composition, or other relevant information. The microprocessor 24 uses the data to determine the notes that will be played by the sound generator 56.

For example, the data scan lines shown in FIG. 2 may be used to transfer data corresponding to a set of four basic notes. The microprocessor 24 controls the sound generator 60 by transmitting information as to which note should be played in response to the pressing of a key on the keyboard 58. When a set of four notes is transmitted to the microprocessor 24, it assigns the four notes to four keys on the keyboard 58 and the same four notes in the octaves above and below the current octave to eight other keys of the keyboard.

Specifically, if the current key is 'C 7th', codes for the notes 'C', 'E', 'G', and 'B-flat' would be transmitted through the video screen 14 to the data input device 12. These four notes would be assigned to keys 5 through 8 on the keyboard 58. The same notes, but in the octave below the current octave, would be assigned to keys 1 through 4 on the keyboard. While the same notes, but in the octave above the current octave, would be assigned to keys 9 through 12 on the keyboard. Thus, the pressing of the 6th key on the keyboard 58, causes the microprocessor 24 to transmit information to the sound generator 60 that the note 'E' in the current octave should be played.

In another example, if a data code for the note 'C' were transferred, the microprocessor 24 would assign the entire 'C' major scale to the keys of the keyboard 58. Thus, the notes assigned to the keys of the keyboard 58 change with the composition data transferred via the data input device 12 and the note information transmitted to the sound generator 60 from the microprocessor 24 is dependent upon the keys played on the keyboard 58 and the composition data transferred by the data input device 12. The result is that any note played using the present invention will be in harmony with the composition it accompanies from the video screen 14 and an associated speaker.

Although described for purposes of clarity with regard to specific preferred embodiments, the present invention is not limited to those embodiments, but rather is applicable broadly to all versions falling within the scope and spirit of the appended claims. For example, the microprocessor 24 may be used to combine composition data transferred via the data input device 12 with notes selected on the keyboard 58 to obtain new data commands that may be output via an interface to a second instrument or musical device or stored in a memory 64 connected to the microprocessor 24.

What is claimed is:

1. A data transfer system, comprising:
   a video screen having a data display area;
   means for displaying a synchronizing scan line having an intensity that increases with each video screen refresh at a predetermined location in the data display area of the video screen;
   means for displaying an electronic data scan line having an intensity that may increase only at a plurality of predetermined locations on the scan line in the data display area of the video screen; and
   a data input device comprising
      sensing means for sensing the increase in intensity of the synchronizing scan line and for sensing an increase in intensity of the data scan line; and
      means for determining a time difference between the time the sensing means senses the increase in intensity of the synchronizing scan line and the time the sensing means senses an increase in intensity of the data scan line whereby to determine the location of the increase in intensity of the data scan line in the data display area.

2. The data transfer system of claim 1 wherein the sensing means is an optical sensor.

3. The data transfer system of claim 1 wherein the sensing means is a photo diode.

4. The data transfer system of claim 1 wherein the determining means includes:
   a leading edge detector responsive to the sensing means; and
   a timer responsive to the leading edge detector to determine the time interval between the increase in intensity of the synchronizing scan line and an increase in intensity of the data scan line.

5. A data transfer system for use with a video screen having a data display area, means for displaying a synchronizing scan line having an intensity that increases with each video screen refresh at a predetermined location in the data display area of the video screen and means for displaying an electronic data scan line having an intensity that may increase only at a plurality of predetermined locations on the scan line in the data display area of the video screen, comprising:
   a data input device including
      sensing means for sensing the increase in intensity of a synchronizing scan line and for sensing an increase in intensity of a data scan line; and
      means for determining a time difference between the time the sensing means senses the increase in intensity of the synchronizing scan line and the time the sensing means senses an increase in intensity of the data scan line whereby to determine the location of the increase in intensity of the data scan line in the data display area.

6. The data transfer system of claim 5 wherein the sensing means is an optical sensor.

7. The data transfer system of claim 5 wherein the sensing means is a photo diode.

8. The data transfer system of claim 5 wherein the determining means includes:
   a leading edge detector responsive to the sensing means; and a timer responsive to the leading edge detector to determine the time interval between the increase in intensity of the synchronizing scan line and an increase in intensity of the data scan line.

9. The data transfer system of claim 5 further comprising:

a sound generator;

a musical note selector coupled to the sound generator for selecting sounds generated by the sound generator; and the means for determining a time difference is coupled to the sound generator to regulate the sound generator.

10. The system of claim 9 wherein the musical note selector is a keyboard.

11. The system of claim 9 further comprising:

a microprocessor to receive data from the data input device, and memory means connected to the microprocessor for storing information from the microprocessor.

* * * * *